US012250599B2

(12) United States Patent
Guo et al.

(10) Patent No.: US 12,250,599 B2
(45) Date of Patent: Mar. 11, 2025

(54) TECHNOLOGIES FOR RELAY USER EQUIPMENT RESELECTION

(71) Applicant: Apple Inc., Cupertino, CA (US)

(72) Inventors: Shu Guo, Beijing (CN); Dawei Zhang, Saratoga, CA (US); Haijing Hu, Los Gatos, CA (US); Hao Duo, Beijing (CN); Huarui Liang, Beijing (CN); Lanpeng Chen, Beijing (CN); Sudeep Manithara Vamanan, Munich (DE); Yuqin Chen, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 524 days.

(21) Appl. No.: 17/440,079

(22) PCT Filed: Feb. 19, 2021

(86) PCT No.: PCT/CN2021/076847
§ 371 (c)(1),
(2) Date: Sep. 16, 2021

(87) PCT Pub. No.: WO2022/174387
PCT Pub. Date: Aug. 25, 2022

(65) Prior Publication Data
US 2023/0088512 A1    Mar. 23, 2023

(51) Int. Cl.
*H04W 36/00* (2009.01)
*H04W 88/04* (2009.01)

(52) U.S. Cl.
CPC ..... *H04W 36/0038* (2013.01); *H04W 36/033* (2023.05); *H04W 88/04* (2013.01)

(58) Field of Classification Search
CPC .. H04W 36/03; H04W 36/0038; H04W 88/04
See application file for complete search history.

(56) References Cited

U.S. PATENT DOCUMENTS

2023/0224778 A1*   7/2023   Perras ................ H04W 36/03
                                                  370/331

FOREIGN PATENT DOCUMENTS

| CN | 105451282 | 3/2016 |
|---|---|---|
| CN | 107113593 | 8/2017 |
| CN | 107710862 | 2/2018 |
| WO | 2016163835 | 10/2016 |

OTHER PUBLICATIONS

International Patent Application No. PCT/CN2021/076847, International Preliminary Report on Patentability, Aug. 31, 2023, 6 pages.
International Patent Application No. PCT/CN2021/076847, International Search Report and Written Opinion, Mailed on Nov. 10, 2021, 10 pages.

(Continued)

Primary Examiner — Justin Y Lee
(74) Attorney, Agent, or Firm — Kilpatrick Townsend & Stockton LLP

(57) ABSTRACT

The present application relates to devices and components including apparatus, systems, and methods for security enhancement with respect to reselection of relay user equipment.

17 Claims, 10 Drawing Sheets

(56) References Cited

OTHER PUBLICATIONS

3rd Generation Partnership Project; Technical Specification Group Services and System Aspects; Study on system enhancement for Proximity based Services (ProSe) in the 5G System (5GS) (Release 17), 3GPP TR 23.752 V1.0.0, Nov. 2020, 181 pages.

3rd Generation Partnership Project; Technical Specification Group Services and System Aspects; Study on security aspects of enhancement for proximity based services in the 5G System (5GS), 3GPP TR 33.847 V0.4.0, Jan. 2021, 106 pages.

3rd Generation Partnership Project; Technical Specification Group RServices and System Aspects; Security Aspects of Proximity based Services (ProSe) in the 5G System (5GS) (Release 17), 3GPP TS 33.503 V0.2.0, Nov. 2021, 31 pages.

* cited by examiner

800 

```
┌─────────────────────────────────────────────────┐
│  Detecting a trigger to perform a relay UE reselection │
│                         804                      │
└─────────────────────────────────────────────────┘
                          │
                          ▼
┌─────────────────────────────────────────────────┐
│ Detecting a candidate relay UE having a security capability equal to or │
│      greater than a predetermined threshold      │
│                         808                      │
└─────────────────────────────────────────────────┘
                          │
                          ▼
┌─────────────────────────────────────────────────┐
│ Generating a relay UE reselection request to include an identifier of the │
│              candidate relay UE                  │
│                         812                      │
└─────────────────────────────────────────────────┘
                          │
                          ▼
┌─────────────────────────────────────────────────┐
│  Transmitting the relay UE reselection request to a target UE │
│                         816                      │
└─────────────────────────────────────────────────┘
```

Figure 8

TECHNOLOGIES FOR RELAY USER EQUIPMENT RESELECTION

CROSS-REFERENCES TO RELATED APPLICATIONS

This application is the U.S. National Phase application of International Application No. PCT/CN2021/076847, filed Feb. 19, 2021, the contents of which is hereby incorporated by reference in its entirety for all purposes.

BACKGROUND

Third Generation Partnership Project (3GPP) has ongoing work items related to providing signaling and architectural enhancements to support proximity-based services. Consideration of aspects to enhance user equipment (UE)-to-UE relay functionality is needed.

BRIEF DESCRIPTION OF THE DRAWINGS

FIG. 8 illustrates another operational flow/algorithmic structure in accordance with some aspects.

DETAILED DESCRIPTION

Figure 1:
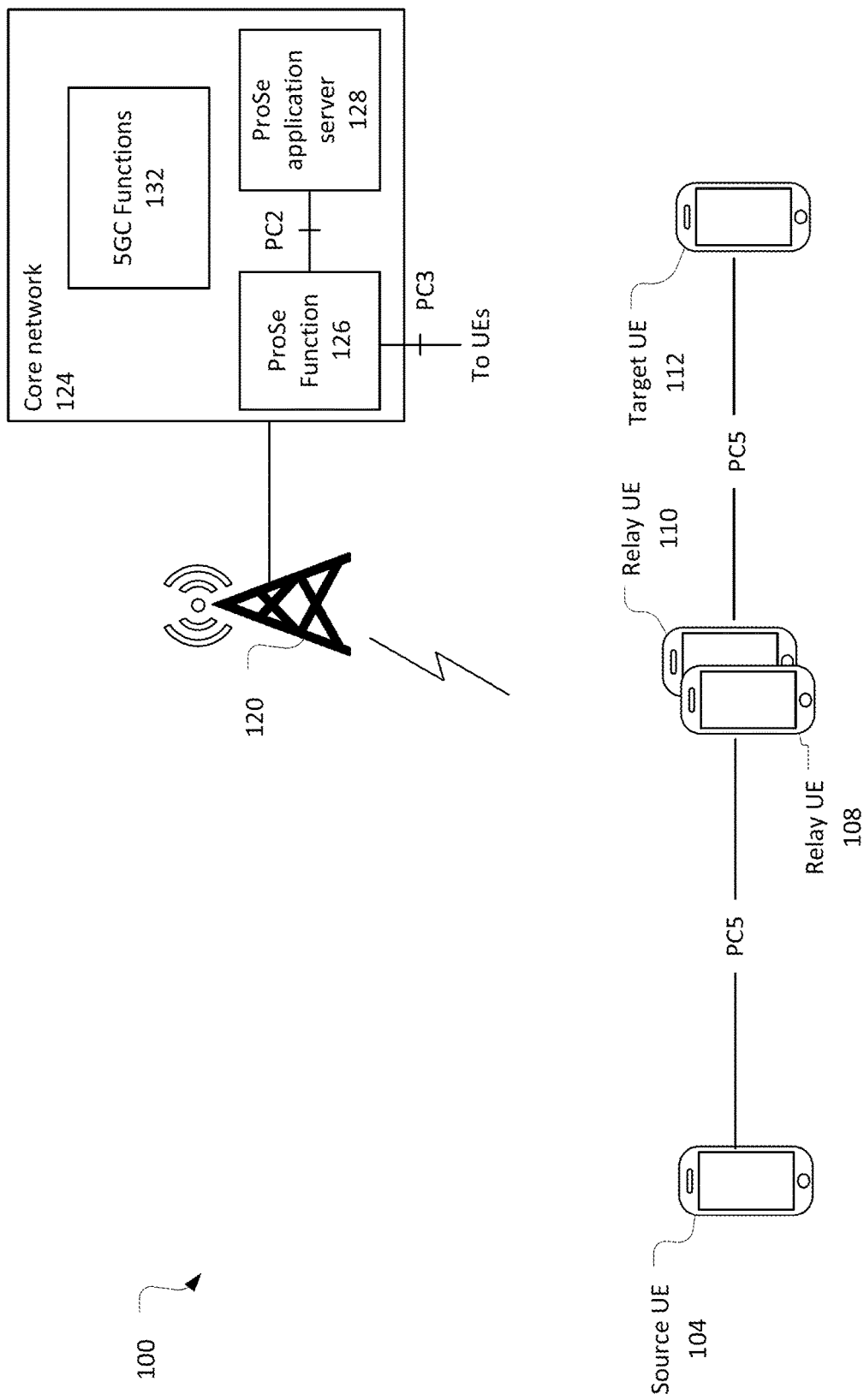
FIG. 1 illustrates a network environment in accordance with some aspects.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various aspects. However, it will be apparent to those skilled in the art having the benefit of the present disclosure that the various aspects of the various aspects may be practiced in other examples that depart from these specific details. In certain instances, descriptions of well-known devices, circuits, and methods are omitted so as not to obscure the description of the various aspects with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some aspects, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these aspects, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized hardware, network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a plurality of UEs including, for example, a source UE 104, UE-to-UE relay UEs 108 and 110 (or simply, "relay UEs 108 and 110"), and target UE 112. The UEs may operate in accordance with, or in a manner compatible to, Long Term Evolution (LTE), or Fifth Generation (5G) New Radio (NR) system standards as provided by 3GPP technical specifications.

The UEs of the network environment 100 may be configured for proximity services (ProSe) communications in which the UEs may communicate directly with one another without the communications traversing through a base station 120 that provides a radio access network cell. The UEs may be mobile phones, consumer electronic devices, tablet computers, wearable computer devices (for example, smart-watches), vehicular computer devices, infrastructure equipment, sensors, or other devices such as described with respect to FIG. 10.

One or more of the UEs may communicate with the base station 120 that provides a wireless access cell, for example, an LTE cell or an NR cell. The base station 120 may be an evolved node B (eNB) providing an LTE access cell and being coupled with an evolved packet core (EPC) network; an ng-eNB providing an LTE access cell and coupled with a 5G core network (5GC); or a gNB providing an NR access cell and coupled with a 5GC.

The base station 120 may be coupled with a core network 124, which may be an EPC or a 5GC, to provide the UEs with services. The core network 124 may include network elements configured to offer various data and telecommunications services to customers/subscribers (for example, users of UEs) who are connected to the core network 124 via an access cell provided by the base station 120. The components of the core network 124 may be implemented in one physical node or separate physical nodes including components to read and execute instructions from a machine-readable or computer-readable medium (for example, a machine-readable storage medium). In some embodiments, network function virtualization (NFV) may be utilized to virtualize any or all of the above-described network node functions via executable instructions stored in one or more computer-readable storage mediums (described in further detail below). A logical instantiation of the core network 124 may be referred to as a network slice, and a logical instantiation of a portion of the core network 124 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more components/functions.

The core network 124 may include a ProSe function 126 that is a logical function used for network-related actions related to ProSe operations. The ProSe function 126 may interface with UEs through a PC3 interface and with a ProSe application server 128 through a PC2 interface.

The ProSe function 126 may control a direct provisioning function (DPF) used to provision a UE with necessary parameters in order to use ProSe direct discovery in ProSe direct communication. The DPF may provision UEs with public land mobile network (PLMN) specific parameters that allow the UE to use ProSe in a particular PLMN. The DPF may also provision a UE with parameters that may be used for direct communication when the UE is not served by radio access network cell. The ProSe function 126 may also include a direct discovery name management function for open ProSe direct discovery to allocate and process the mapping of ProSe applications identifiers and ProSe application codes used in ProSe direct discovery.

The ProSe application server 128 may store and manage various ProSe identifiers, metadata, and authorizations related to various discovery operations.

At a particular time, the UEs may be within or out of coverage of a radio access network cell provided by a base station such as base station 120. For example, at a given time the UEs of the network environment 100 may be in a full-coverage scenario (for example, all UEs are within cell coverage), partial-coverage scenario (for example, a subset of the UEs may be within cell coverage), or out-of-coverage scenarios (for example, no UEs are within cell coverage).

The source UE 104 and the target UE 112 may establish communications with one another via the relay UE 108. This may often be done when the source UE 104 and target UE 112 are in out-of-coverage scenarios, but it may also be done in full-or partial coverage scenarios. The source UE 104 may seek to discover a UE-to-UE relay (for example, relay UE 108) through which it may connect to the target UE 112. The source UE 104 may discover the relay UE 108 without the assistance of the base station 102 in a standalone discovery procedure. After the source UE 104 discovers and selects the relay UE 108, the UEs may establish a direct connection with one another through a sidelink (SL) interface. An SL interface may alternatively be referred to as a ProSe interface, device-to-device (D2D) interface, or a PC5 interface or reference point. The relay UE 108 may relay unicast traffic between the source UE 104 and the target UE 112.

At some point, the source UE 104 or the target UE 112 may detect a reselection trigger that prompts it to perform a relay reselection. The reselection trigger may be based on, for example, an application layer trigger or current relay conditions. The source UE 104 or the target UE 112 may find that a signal quality with another UE-to-UE relay (for example, relay UE 110) is better than that with the currently used UE-to-UE relay (for example, relay UE 108). In another example, the source UE 104 or the target UE 112 may find that the signal quality with the currently used UE-to-UE relay (for example, relay UE 108) is not sufficient and it may initiate a discovery message to find candidate UE-to-UE relays that can provide a better connection. Other embodiments may include other reselection triggers. In general, the UE-to-UE relay reselection may be similar to that described in solution #50 of Technical Report (TR) 23.752 v1.0.0 (2020-11) or simply redoing a relay selection as described in Solution #8 of TR 23.752.

In current procedures, a source UE may send candidate relay identifiers (IDs) to a current relay UE and the current relay UE will forward it to a target UE. There is no mechanism by which the target UE is made aware of the security capability of the candidate relays. Thus, the target UE is not able to ensure the reselected relay UE aligns with its security policy. Embodiments of the present disclosure describe procedures to ensure that a reselected relay has security capabilities that align with the security policy of the target UE.

A security capability of a relay UE may refer to whether the relay UE supports specific categories or levels of security, integrity, or confidentiality algorithms. For example, in some embodiments, security capabilities may include encryption algorithms such as, but not limited to, a null ciphering algorithm; a SNOW 3G based algorithm (for example, UEA2 or UIA2 algorithms); an advanced encryption standard (AES)-based algorithm; or ZUC-based algorithm (for example, EEA3 and EIA3 algorithms). In other embodiments, other levels, categories, or types of security capabilities may be used.

The relay UE 108 may relay communications at different layers of a protocol stack. For example, the relay UE 108 may be a Layer-2 (L2) relay or a Layer-3 (L3) layer. L2 and L3 relays may include different protocol stacks and security mechanisms. For example, an L3 relay may include an application layer security mechanism, while an L2 relay may not provide such a high-layer security mechanism. Embodiments described herein apply equally to L2 and L3 relays.

Figure 2:
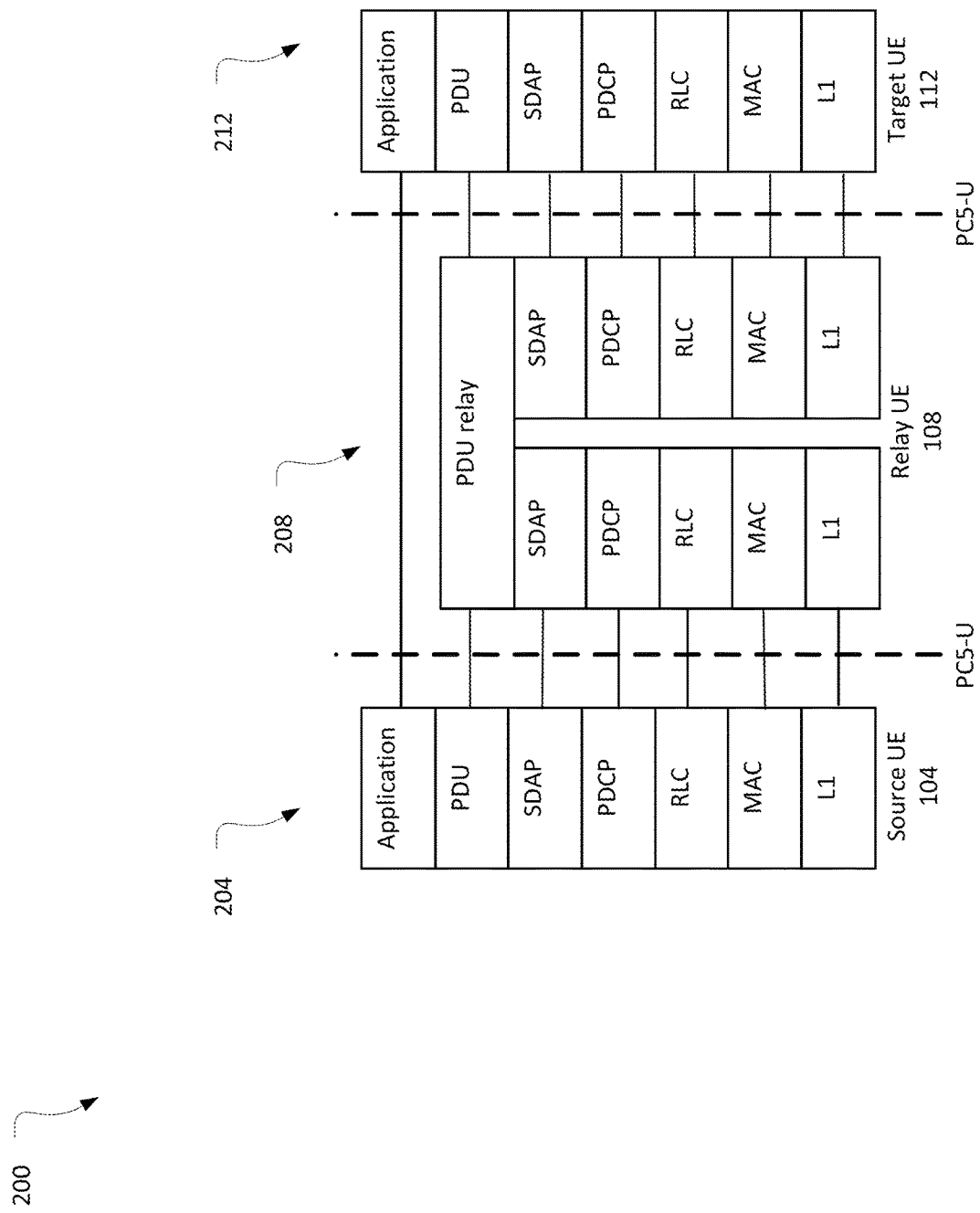
FIG. 2 illustrates protocol stack connections for a Layer 3 UE-to-UE relay in accordance with some embodiments.

FIG. 2 illustrates protocol stack connections 200 in embodiments in which the relay UE 108 is an L3 relay. In particular, FIG. 2 illustrates a protocol stack 204 of the source UE 104, protocol stacks 208 of the relay UE 108, and protocol stacks 212 of the target UE 112.

The protocol stack 204 may include layers coupled with respective layers of the protocol stacks 208 and 212 over a PC5—user plane (U) interface. The protocol stack 204 may include a Layer 1 (L1), a media access control (MAC) layer, a radio link control (RLC) layer, a packet data convergence protocol (PDCP) layer, a service data adaptation protocol (SDAP) layer, a protocol data unit (PDU) layer, and an application layer. The MAC, RLC, PDCP, and SDAP may be L2 layers (or sublayers), while the PDU layer may be an L3 layer.

The application layer may use lower layers to provide a data transfer service.

The PDU layer may process PDUs that are transported between the source UE 104 and a target UE 112 during a PDU session. A PDU session may be, for example, and Internet protocol v6 (IPv6) session type for transporting IP packets or an Ethernet session type for transmitting Ethernet frames.

The SDAP layer may perform operations such as mapping between quality of service (QoS) flows and data radio bearers and marking QoS flow identifiers in both downlink and uplink packets.

The PDCP layer may control transfer of user/control plane data, header compression, ciphering, and integrity protection.

The RLC layer may transfer upper layer protocol data units in an acknowledged mode, unacknowledged mode, or transparent mode. The RLC layers may manage RLC service data units and protocol data units separately for each of these modes to provide error detection and recovery.

The MAC layer may perform mapping between logical channels and transport channels for transmitter and receiver; multiplexing for a transmitter; demultiplexing for a receiver, scheduling information reporting for a transmitter; error correction through hybrid automatic repeat request (HARQ) for a transmitter/receiver; logical channel prioritization for the transmitter; and radio resource selection for the transmitter.

The L1 layer, which may be referred to as a physical (PHY) layer, may provide physical layer processing as well as transmission and reception across a communication interface. The L1 layer may add cyclic redundancy check bits to transport blocks at a transmitter to allow error detection at a receiver. The L1 layer may also perform channel coding, interleaving, and modulation to efficiently transmit/receive information over the communication interface.

Layers within protocol stacks 208 and 212 may operate in a similar manner to like-named layers in protocol stack 204.

The protocol stacks 208 may also include a PDU relay to relay traffic of a PDU session between PDU layers of protocol stack 204 and 212. In this example, the relay UE 108 may operate as an L3 relay given that it includes L3 processing of the traffic (for example, at the PDU layer).

Figure 3:
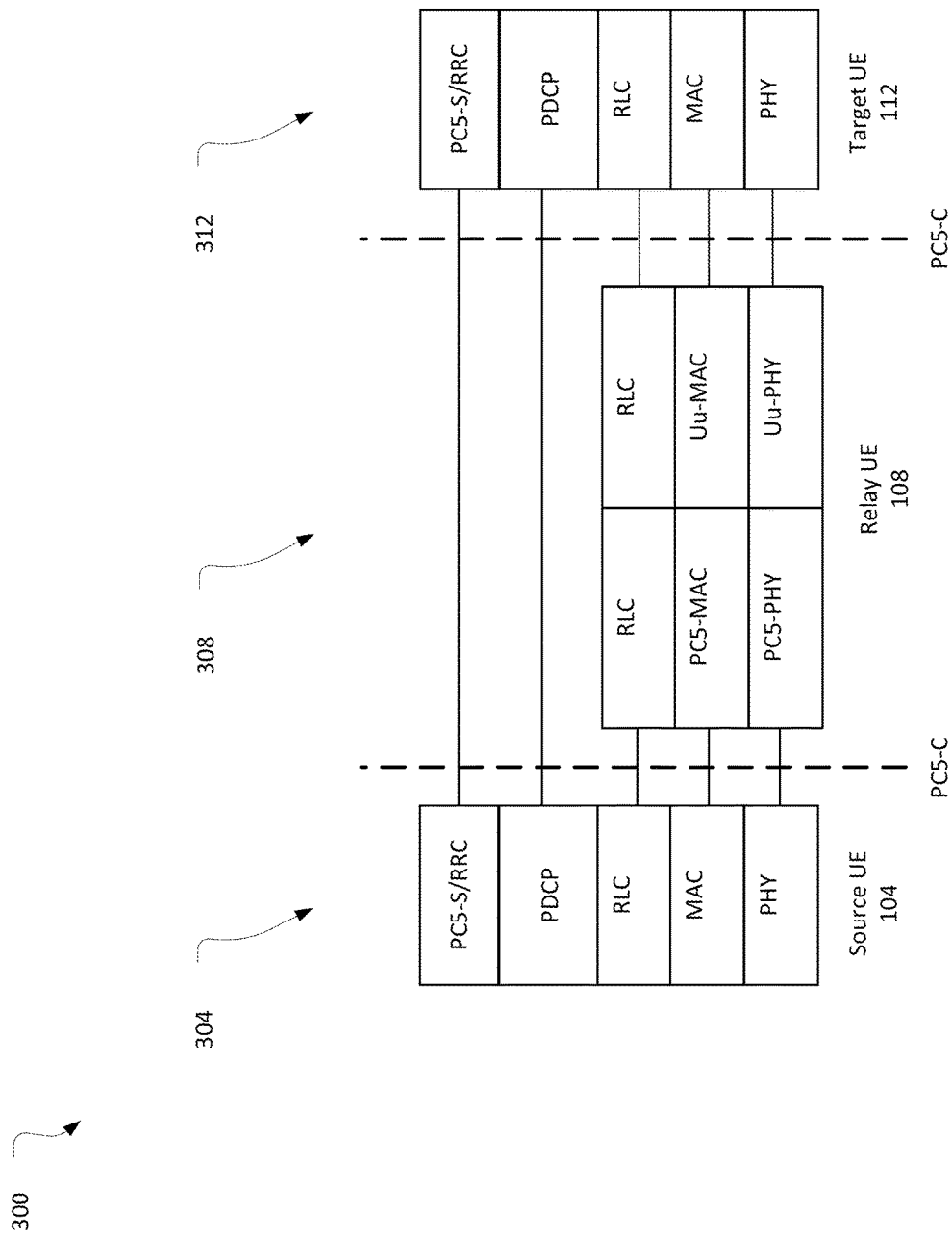
FIG. 3 illustrates protocol stack connections for user-plane traffic for a Layer 2 UE-to-UE relay in accordance with some embodiments.

FIG. 3 illustrates example protocol stack connections 300 for control-plane traffic in embodiments in which the relay UE 108 is an L2 relay. In particular, FIG. 3 illustrates a protocol stack 304 of the source UE 104, protocol stacks 308 of the relay UE 108, and protocol stacks 312 of the target UE 112.

The protocol stack 304 may include a PC5-S or RRC layer coupled directly with a corresponding PC5 signaling protocol (PC5-S) or RRC layer of protocol stack 312; and a PDCP layer coupled directly with a corresponding PDCP layer of protocol stack 312. The RRC layer may be a L3 protocol that manages an RRC connection between endpoints. The PC5-S layer may perform control plane signaling over the PC5 reference point for a secure L2 link. The RRC layer may perform establishment and release functions, broadcast system information, establish radio bearers, perform mobility procedures, etc.

The protocol stacks 304 and 312 may further include an SDAP layer, a PDCP layer, an RLC layer, a MAC layer, and a PHY layer. Unless otherwise described, these layers may be similar to like-named layers described above with respect to FIG. 2.

The protocol stacks 308 of the relay UE 108 may only include layers up to L2, for example, PHY, MAC, and RLC layers. The relay UE 108 may generate and insert its L2 ID as a source ID for L2 frames that are forwarded to the target UE 112 or the source UE 104. The relay UE 108 may otherwise transparently transfer the higher-layer signaling messages between the source UE and the target UE 112 without modification. This may be evidenced by the layers of the protocol stack 304 above L2, for example PDCP and PC5-S/RRC, shown as interfacing directly with corresponding layers of protocol stack 312.

Figure 4:
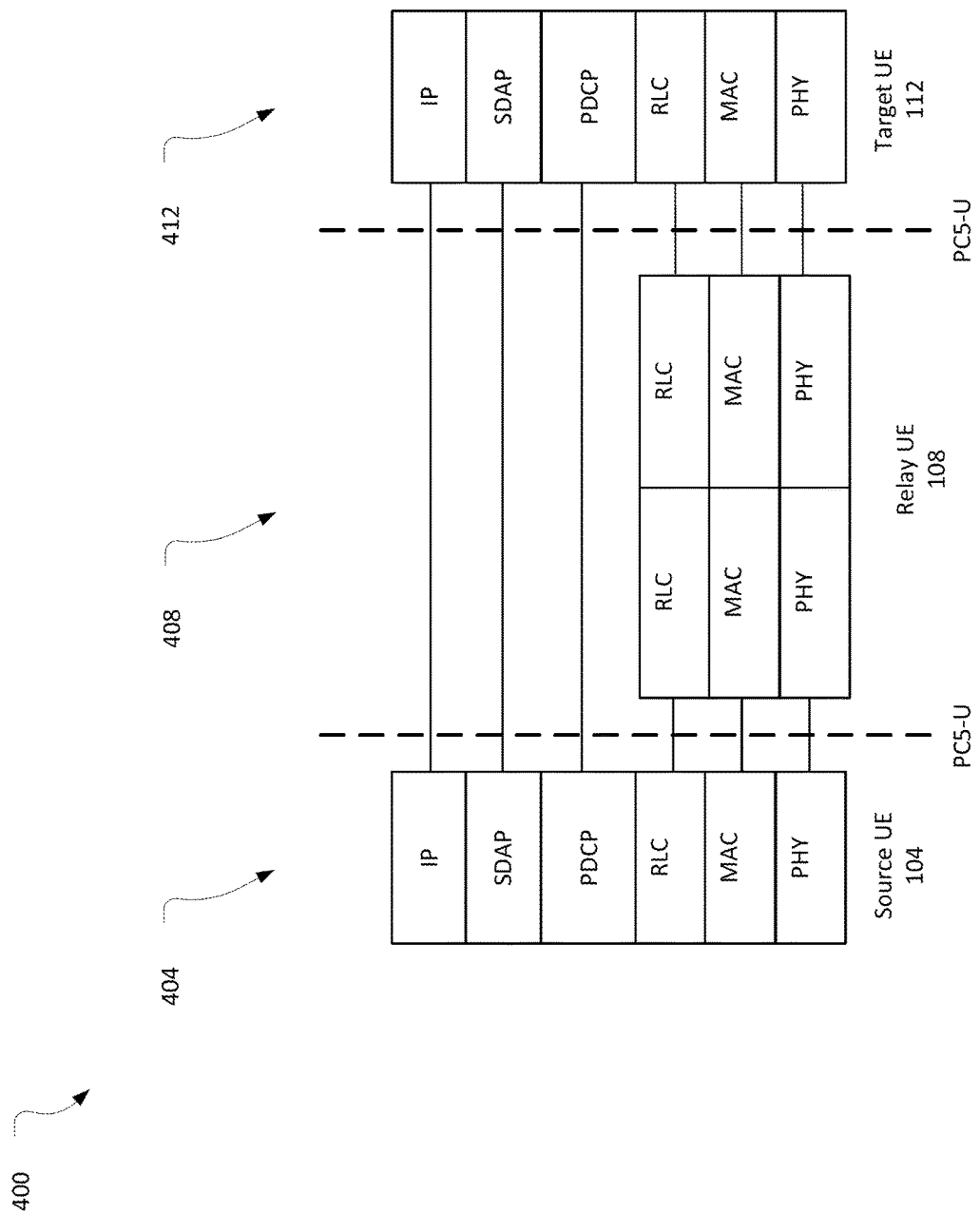
FIG. 4 illustrates protocol stack connections for control-plane traffic for a Layer 2 UE-to-UE relay in accordance with some embodiments.

FIG. 4 illustrates example protocol stack connections 400 for user-plane traffic in embodiments in which the relay UE 108 is an L2 relay. In particular, FIG. 4 illustrates a protocol stack 404 of the source UE 104, protocol stacks 408 of the relay UE 108, and protocol stacks 412 of the target UE 112.

The protocol stack 304 may include an IP layer to exchange IP packets of an
IP session with an IP layer of protocol stack 412. The protocol stacks 404 and 412 may further include an SDAP layer, a PDCP layer, an RLC layer, a MAC layer, and a PHY layer. Unless otherwise described, these layers may be similar to like-named layers described above with respect to FIG. 2.

The protocol stacks connections 300 and 400 may be similar to those described in section 6.9.1.2 of TR 23.752.

Figure 5:
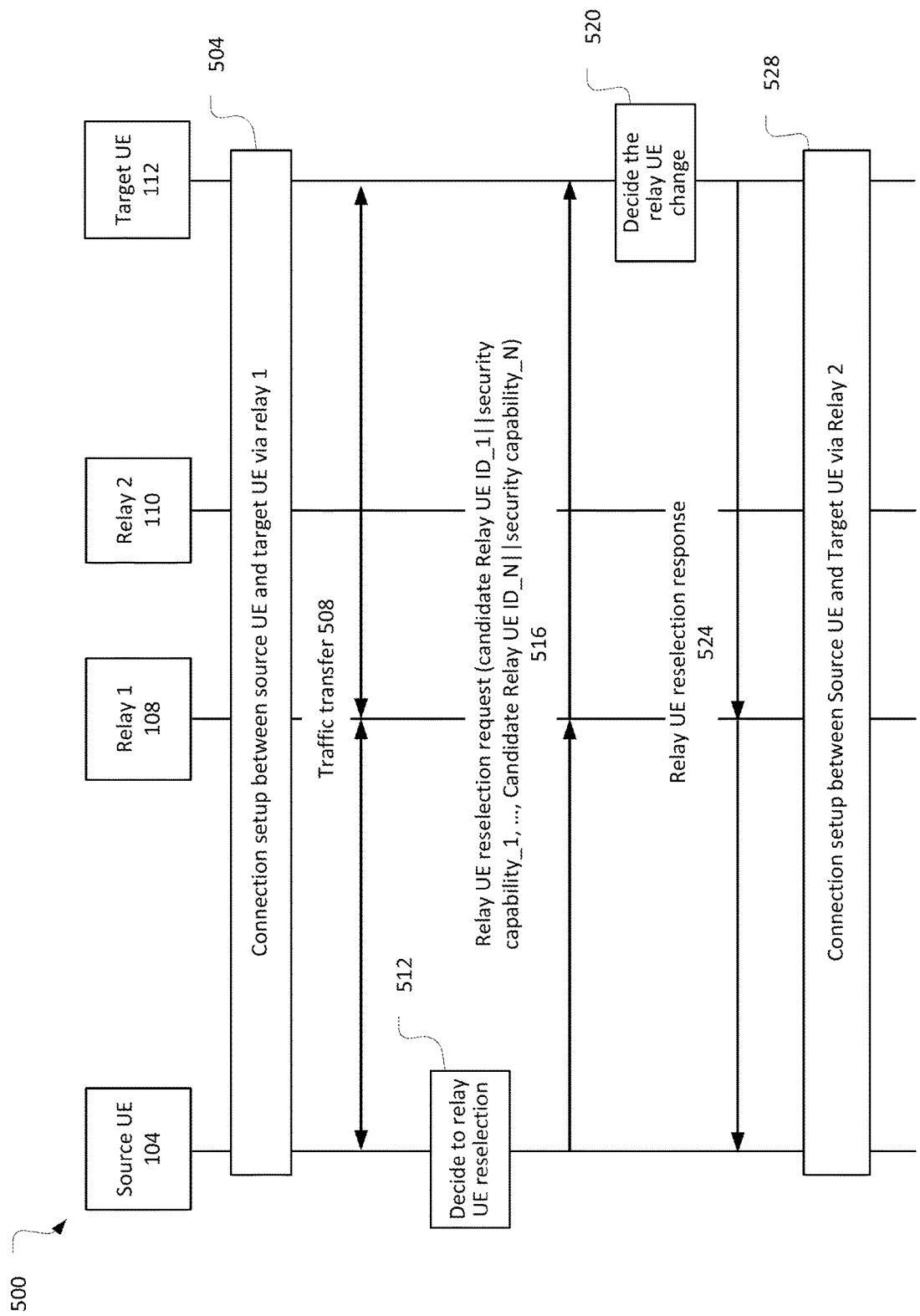
FIG. 5 illustrates a signaling diagram in accordance with some embodiments.

FIG. 5 illustrates a signaling diagram 500 for a relay reselection in accordance with some embodiments. Except as otherwise described herein, the signaling diagram 500 may be similar to that described with respect to solution #50 in section 6.50.2-1 of TR 23.752.

At 504, a connection may be setup between the source UE 104 and the target UE 112 via the relay UE 108 (which may also be referred to as relay UE 1 in this discussion). The setup may be similar to that described in solutions #8, #9, or another solution as described in TR 23.752.

At 508, once the connection is established, traffic may be transferred from the source UE 104 to the target UE 112 and vice versa via relay UE 108.

At 512, the source UE 104 may decide to perform a UE-to-UE relay reselection. This may be triggered by receiving a relay discovery message from another UE-to-UE relay that is associated with a signal quality that is greater than a signal quality associated with a current relay. For example, the source UE 104 may receive a relay discovery message from relay UE 110 and determine that a signal quality associated with relay UE 110 is greater than a signal quality associated with relay UE 108. Alternatively, the source UE 104 may initiate a discovery process by, for example, sending a discover message to find one or more candidate UE-to-UE relays that can provide a better relay connection. The source UE 104 may initiate the discovery process when it finds that the signal quality with an existing relay (for example, relay UE 108) is not good enough (for example, is less than a predetermined acceptable level).

When the source UE 104 is discovering a new UE-to-UE relay, it may perform a preliminary check to determine that a security capability of the candidate UE satisfies a security policy of the source UE. For example, only relay UEs that have a security capability that is equal to or greater than a threshold capability of the security policy of the source UE may be included in a candidate relay UE list of the source UE 104. The source UE 104 may acquire the security capabilities of a candidate UE as part of a discovery process.

After the source UE 104 identifies the candidate UE-to-UE relays, the source UE 104 may, at 516, generate and send a relay UE reselection request to the target UE 112 using the established connection via the relay UE 108. The relay UE reselection request may include the candidate relay UE list. In particular, the relay UE reselection request may include candidate information for each of the candidate relay UEs. The candidate information may include an identifier (ID) and security capability for a respective candidate relay UE. The candidate information may be presented in the relay UE reselection request in an order of preference of the source UE 104. The preference may be based on signal quality associated with the UE-to-UE relays. The preference may additionally/alternatively be based on security capabilities of the UE-to-UE relays. For example, the relay UEs having higher levels of security capabilities may be preferred over relay UEs having lower levels of security capabilities.

At 520, the target UE 112 may decide to change from the relay UE 108 to a relay UE selected from the list of candidate relay UEs included in the relay reselection request. For example, the target UE 112 may decide to change from relay UE 108 to relay UE 110. The decision may be based on the relay UE 110 providing a relatively highest signal quality of the candidate relay UEs and an order of the listed candidate relay UEs. In some embodiments, the decision at 520 may be additionally/alternatively based on a security capability of each candidate relay UE in the candidate relay UE list. For example, the target UE 112 may only select a relay UE that meets its security requirements. In some embodiments, a relay UE may meet the security requirements of the target UE 112 if it has a security capability that is equal to or greater than a threshold security capability of a security policy of the target UE 112. In the event that no candidate relay UE in the candidate relay UE list meets the target UE's security requirement, the target UE 112 may determine not to change the relay path.

If the target UE 112 does not receive a relay discovery message from a candidate relay UE, or does not connect to the candidate relay UE, the target UE 112 may perform a UE-to-UE relay discovery procedure with a candidate UE-to-UE relay ID in the discovery message.

At 524, the target UE 112 may generate and transmit a relay UE reselection response to the source UE 104 via the relay UE 108. The reselection response message may include the selected relay ID, for example, the ID of the relay UE 110. In the event that no new relay UE is chosen by the target UE 112, the target UE 112 may not respond to the reselection request message or may send a response that indicates a relay reselection failure.

At 528, in the event that the target UE 112 did select a relay UE for reselection, the source UE 104 may initiate or otherwise perform a connection setup procedure via the selected relay UE, for example, relay UE 110, and may release the connection through relay UE 108.

Figure 6:
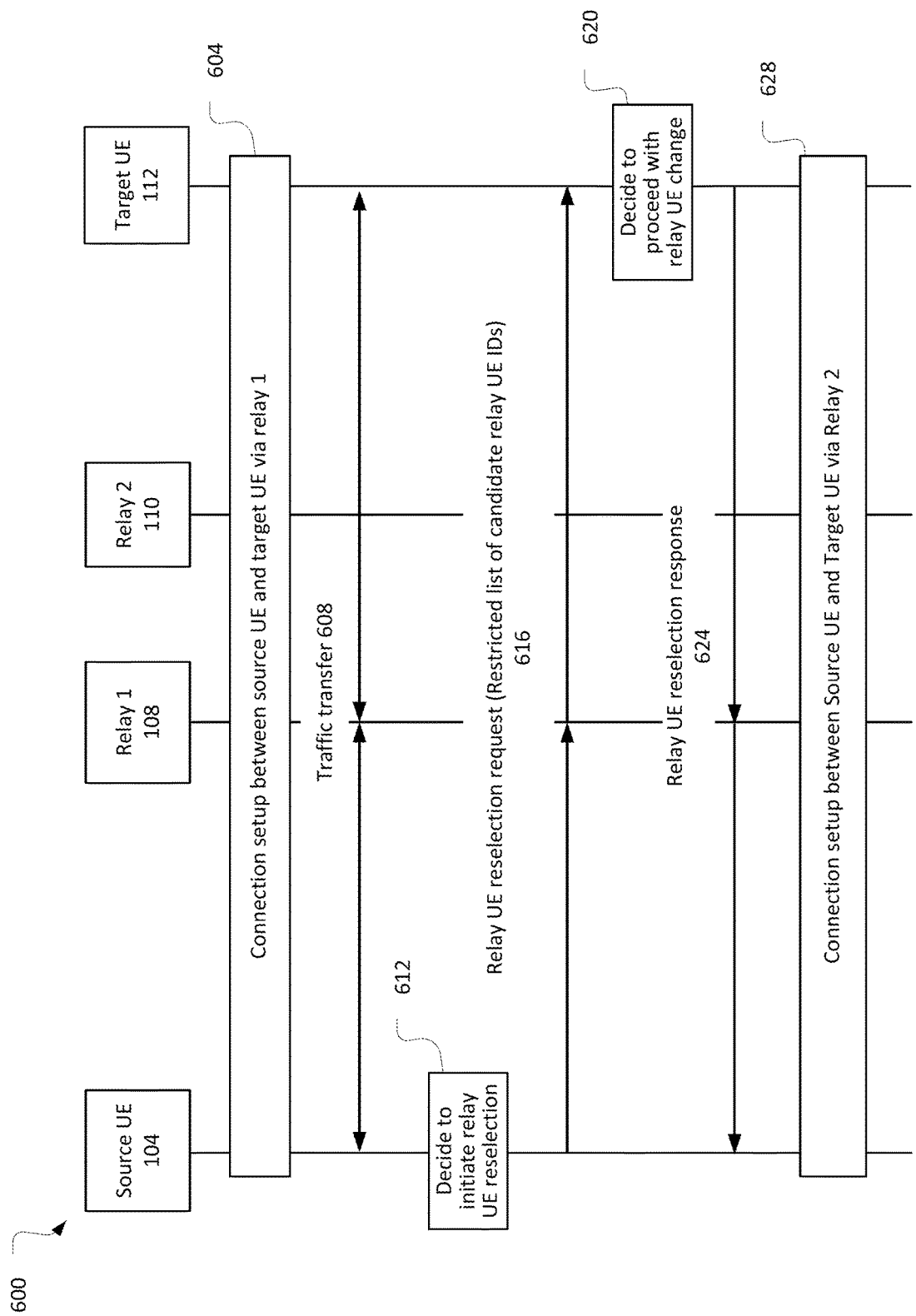
FIG. 6 illustrates another signaling diagram in accordance with some embodiments.

FIG. 6 illustrates a signaling diagram 600 for a relay reselection in accordance with some embodiments. The operations and signaling of the relay reselection embodied by signaling diagram 600 may be similar to like-named operations and signaling of the relay selection embodied by signaling diagram 500. However, in this embodiment, the source UE 104 may take a security policy of the target UE 112 into consideration when deciding to initiate the relay UE reselection.

At 604, the source UE 104 may receive an indication of a security policy of the target UE 112. In discovery of candidate relay UEs, the source UE 104 may filter the relay UEs based on security policies of both the source UE 104 and the target UE 112. Only the relay UEs that meet both security policies may be identified as candidate relay UEs and included in the candidate relay UE list of the relay UE reselection request transmitted at 616.

In some embodiments, the candidate relay UE list may include IDs for the candidate relay UEs (ordered by preference), but may not include the security capabilities. Given that candidate relay UEs have already been vetted against the security policy of the target UE 112, it may not be necessary to include the security capability information in the reselection request. However, in other embodiments, the reselection request may include the security capability information. This may provide the target UE 112 with additional flexibility of providing an additional basis for selecting a desired relay UE at 620. For example, if the security policy (or preference) of the target UE 112 changes, the target UE 112 may vet the security policies against the more recent security policy/preference.

Figure 7:
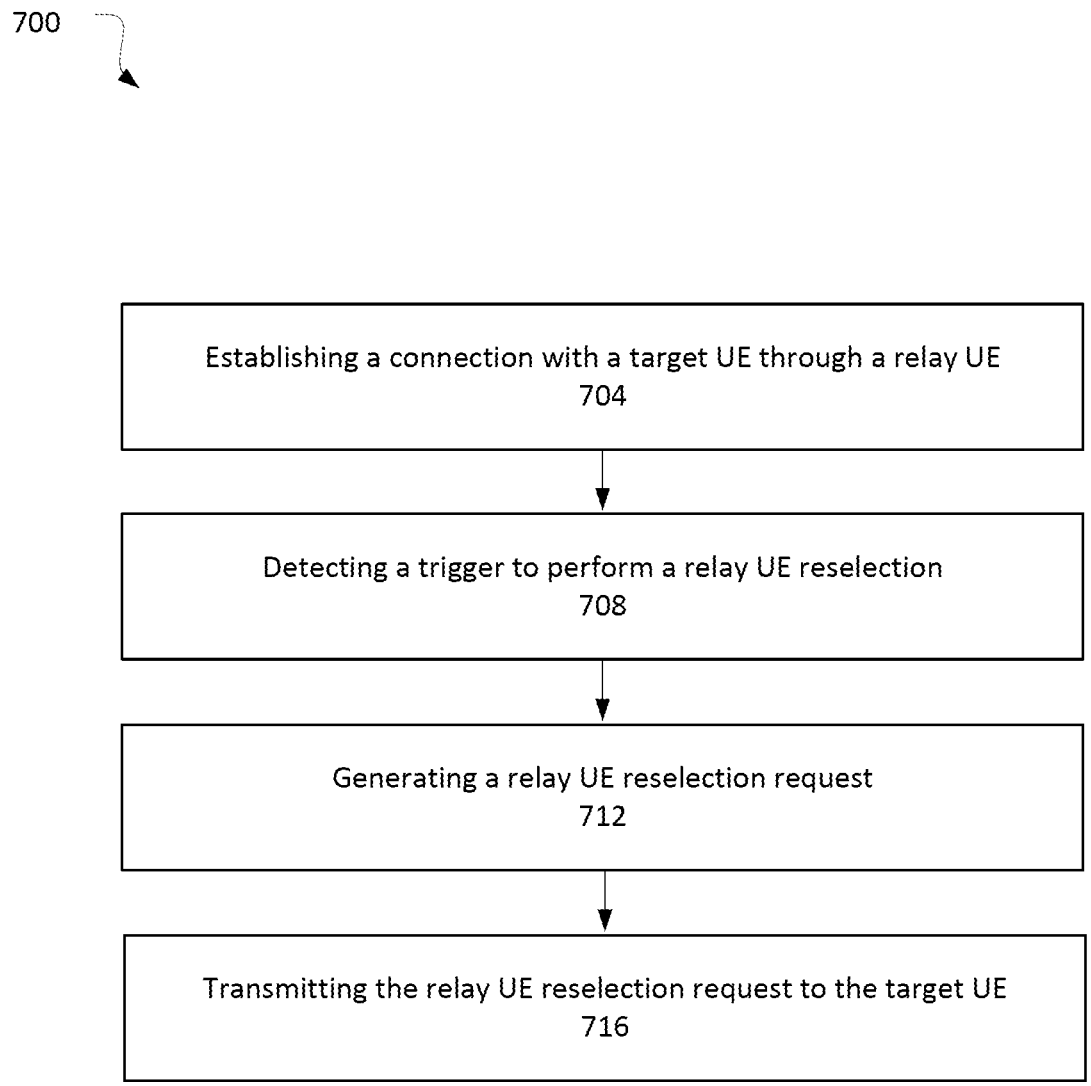
FIG. 7 illustrates an operational flow/algorithmic structure in accordance with some aspects.
Figure 9:
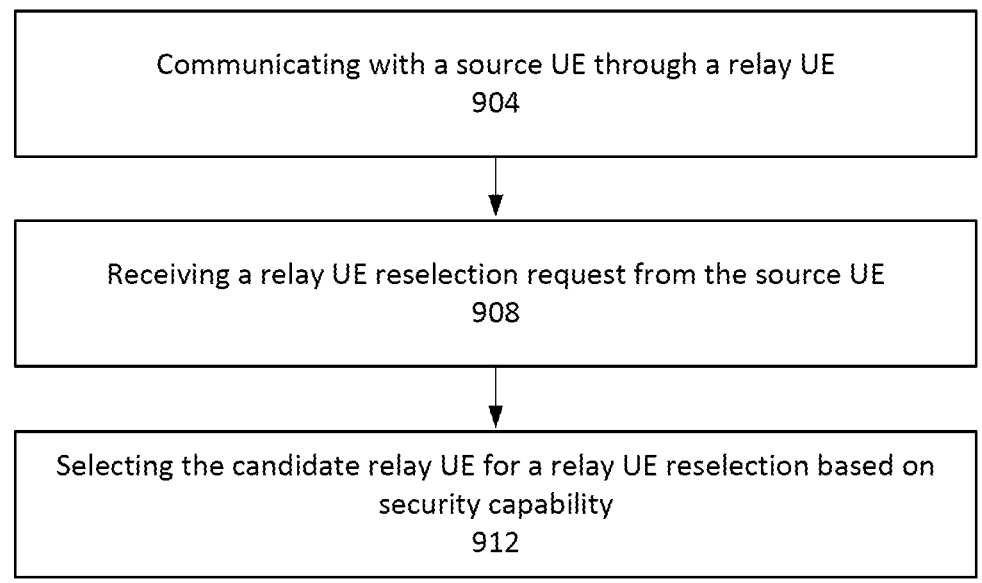
FIG. 9 illustrates another operational flow/algorithmic structure in accordance with some aspects.

FIGS. 7-9 present a number of operation flows/algorithmic structures in accordance with embodiments of this disclosure. These operation flow/algorithmic structures describe a number of operations in a particular sequence. However, the presented sequences are not restrictive. That is, the operations may be performed in sequences other than those specifically presented.

FIG. 7 illustrates an operation flow/algorithmic structure 700 in accordance with some aspects. The operation flow/ algorithmic structure 700 may be performed or implemented by a source UE such as, for example, source UE 104 or UE 1000; or components thereof, for example, baseband processor circuitry 1004A.

The operation flow/algorithmic structure 700 may include, at 704, establishing a connection with a target UE through a relay UE. The source UE may first try to find the target UE by sending a direct communication request or solicitation message with information related to the target UE. If the source UE is not able to communicate directly with the target UE, it may attempt to discover a UE-to-UE relay to reach the target UE by sending a direct communication request or a solicitation message with a relay indication. A UE that is enabled to operate as a UE-to-UE, and is in a position to do so (for example, given current radio, configuration, and load conditions of the relay UE), may forward the message to the target UE. The target UE may respond through the relay UE in order to establish the connection. Except as otherwise described herein, the relay connection may be established between the source UE and the target UE as described in, for example, solution #8 of TR 23.752.

The operation flow/algorithmic structure 700 may further include, at 708, detecting a trigger to perform a relay UE reselection. The trigger may be based on the source or target UE determining that a signal quality with another relay UE is better than a signal quality associated with the relay UE currently providing the relay connection. In some embodiments, the trigger may be based on the source or target UE determining that a signal quality associated with the relay UE currently providing the relay connection is below a predetermined threshold.

Upon detecting the trigger, the source UE may attempt to discover relay UEs that are candidates for taking over the existing relay connection. In the discovery candidate relay UEs, the source UE may obtain a signal qualities associated with the candidate relay UEs, unique identifiers of the relay UEs (which may also be referred to as relay identifiers (RIDs)), and security capabilities of the relay UEs.

The operation flow/algorithmic structure 700 may further include, at 712, generating a relay UE reselection request. The relay UE reselection request may include a list of one or more candidate relay UEs that meet certain selection criteria. The selection criteria may include having security capabilities that satisfy a security policy of the source UE, an acceptable signal quality, etc. The source UE may determine a preference order of the candidate relay UEs that satisfy the selection criteria. The preference order may be based on security capabilities, signal quality, or some other parameter. Candidate information related to each candidate relay UE may be included in the relay UE reselection request in the preference order. The candidate information may include the identifier of the relay UE and its security capabilities.

The operation flow/algorithmic structure 700 may further include, at 716, transmitting the relay UE reselection request to the target UE. The reselection request may be transmitted via the current relay UE.

FIG. 8 illustrates an operation flow/algorithmic structure 800 in accordance with some aspects. The operation flow/ algorithmic structure 800 may be performed or implemented by a source UE such as, for example, source UE 104 or UE 1000; or components thereof, for example, baseband processor circuitry 1004A.

The operation flow/algorithmic structure 800 may include, at 804, detecting a trigger to perform a relay UE reselection. The detecting of the trigger may be similar to that described above with respect to operation 708 of FIG. 7.

The operation flow/algorithmic structure 800 may further include, at 808, detecting a candidate relay UE having a security capability equal to or greater than a predetermined threshold. In some embodiments, the predetermined threshold may be based on a security policy of both the source UE and a target UE. The source UE 104 may obtain, at some point prior to selection of candidate relays, the security policy of the target UE and use this security policy, along with its own, to provide the selection criteria. The source UE may obtain the target UE's selection criteria upon the initial connection setup between the source UE and the target UE or some other time.

The predetermined threshold may be based on both security policies by selecting the greater security policy of the two security policies to provide the threshold. For example, if a threshold of the source UE's security policy is greater than a threshold of the target UE's security policy of the target UE, the threshold of the source UE's security policy may be used as the predetermined threshold for selecting the relay candidates. Conversely, if the threshold of the target UE's security policy is greater than the threshold of the source UE's security policy, the threshold of the target UE's security policy may be used as the predetermined threshold for selecting the relay candidates.

The operation flow/algorithmic structure 800 may further include, at 812, generating the relay UE reselection request to include an identifier of the candidate relay UE detected at 808. The relay UE reselection request may include any other candidate relay UEs that satisfy the predetermined threshold and any other selection criteria. Candidate information of the candidate relay UEs may be included in order of preference as described above with respect to operation 712 of FIG. 7. However, in this embodiment, the candidate information may or may not include the security capabilities of the candidate relay UEs.

In some embodiments, the preference order may be based on security capabilities of the candidate relay UEs (in addition to, or as an alternative of, the signal quality). This may be useful in embodiments in which the security capabilities themselves are not included.

The operation flow/algorithmic structure 800 may further include, at 816, transmitting the relay UE reselection request to the target UE. Transmission of the relay UE reselection request may be similar to that described above with respect to operation 716 of FIG. 7.

FIG. 9 illustrates an operation flow/algorithmic structure 900 in accordance with some aspects. The operation flow/algorithmic structure 900 may be performed or implemented by a target UE such as, for example, target UE 112 or 1000; or components thereof, for example, baseband processor circuitry 1004A.

The operation flow/algorithmic structure 900 may include, at 904, communicating with a source UE through a relay UE. The communication may be through a relay connection setup as described with respect to, for example, operation 704 of FIG. 7.

In some embodiments, the target UE may transmit an indication of a security policy of the target UE to the source UE through the relay connection. This may be done during or after the setup of the relay connection.

The operation flow/algorithmic structure 900 may further include, at 908, receiving a relay UE reselection request from the source UE. The relay UE reselection request may include candidate information corresponding to one or more candidate relay UEs. The candidate information may include a relay identifier and security capability corresponding to the individual candidate relay UEs.

The operation flow/algorithmic structure 900 may further include, at 912, selecting a candidate relay UE for a relay UE reselection based on one or more parameters of the candidate information. In some embodiments, the selecting of the candidate relay UE may be based on a plurality of criteria including the security capabilities. For example, the selected candidate relay UE may be the relay UE associated with the highest signal quality of all UEs with security capabilities that satisfies a security policy of the target UE.

Figure 10:
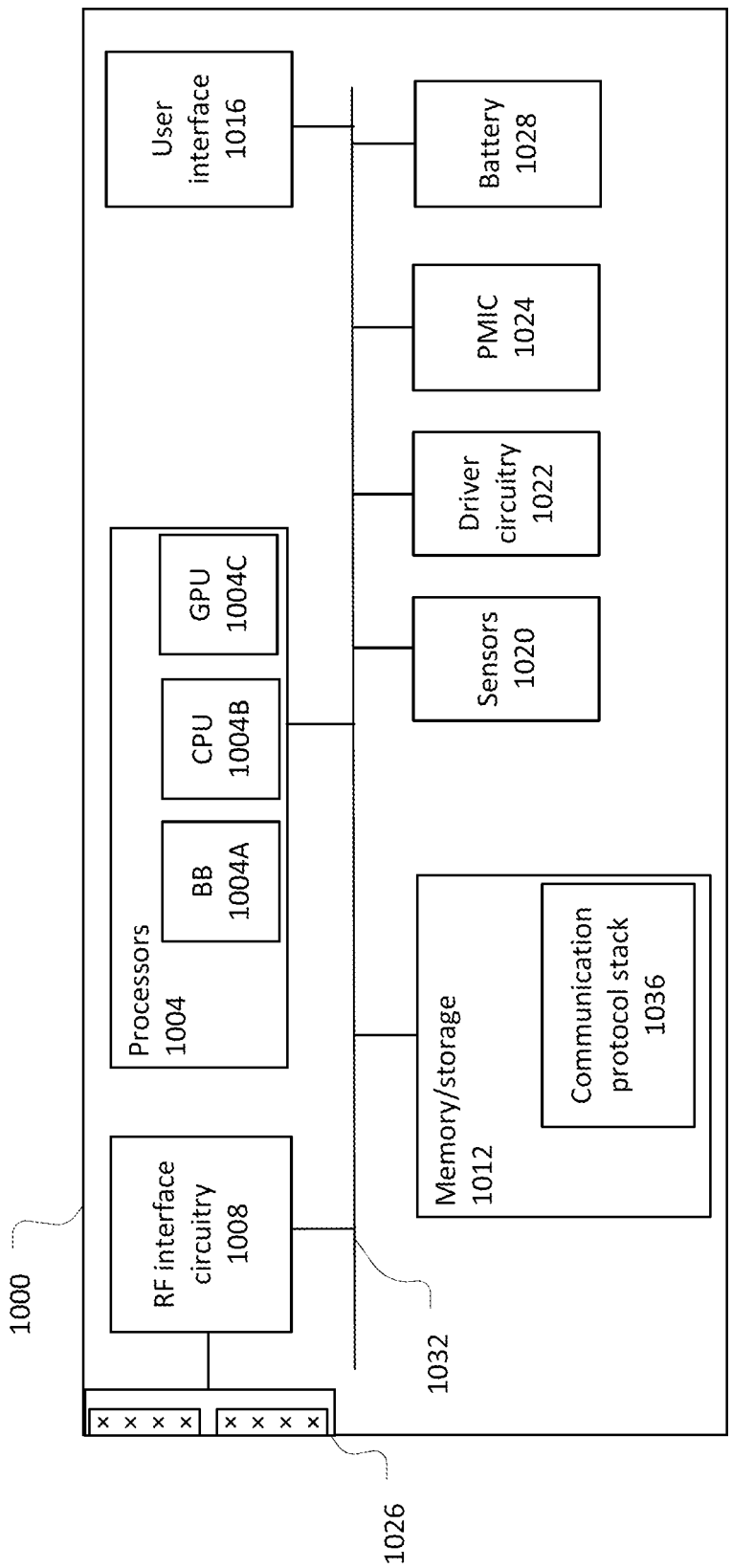
FIG. 10 illustrates a user equipment in accordance with some aspects.

FIG. 10 illustrates a UE 1000 in accordance with some aspects. The UE 1000 may be similar to and substantially interchangeable with UEs 104, 108, or 112.

The UE 1000 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices, proximity sensors, vehicle-based UEs, infrastructure-based UEs.

The UE 1000 may include processors 1004, RF interface circuitry 1008, memory/storage 1012, user interface 1016, sensors 1020, driver circuitry 1022, power management integrated circuit (PMIC) 1024, antenna 1026, and battery 1028. The components of the UE 1000 may be implemented as integrated circuits (ICs), portions thereof, discrete electronic devices, or other modules, logic, hardware, software, firmware, or a combination thereof. The block diagram of FIG. 10 is intended to show a high-level view of some of the components of the UE 1000. However, some of the components shown may be omitted, additional components may be present, and different arrangement of the components shown may occur in other implementations.

The components of the UE 1000 may be coupled with various other components over one or more interconnects 1032, which may represent any type of interface, input/output, bus (local, system, or expansion), transmission line, trace, optical connection, etc. that allows various circuit components (on common or different chips or chipsets) to interact with one another.

The processors 1004 may include processor circuitry such as, for example, baseband processor circuitry (BB) 1004A, central processor unit circuitry (CPU) 1004B, and graphics processor unit circuitry (GPU) 1004C. The processors 1004 may include any type of circuitry or processor circuitry that executes or otherwise operates computer-executable instructions, such as program code, software modules, or functional processes from memory/storage 1012 to cause the UE 1000 to perform operations as described herein.

In some aspects, the baseband processor circuitry 1004A may access a communication protocol stack 1036 in the memory/storage 1012 to communicate over a 3GPP compatible network. In general, the baseband processor circuitry 1004A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some aspects, the PHY layer operations may additionally/alternatively be performed by the components of the RF interface circuitry 1008.

The baseband processor circuitry 1004A may generate or process baseband signals or waveforms that carry information in 3GPP-compatible networks. In some aspects, the waveforms for NR may be based cyclic prefix OFDM (CP-OFDM) in the uplink or downlink, and discrete Fourier transform spread OFDM (DFT-S-OFDM) in the uplink.

The memory/storage 1012 may include one or more non-transitory, computer-readable media that includes instructions (for example, communication protocol stack 1036) that may be executed by one or more of the processors 1004 to cause the UE 1000 to perform various relay UE reselection operations described herein. The memory/storage 1012 may also store candidate information and security policies as described elsewhere.

The memory/storage 1012 include any type of volatile or non-volatile memory that may be distributed throughout the UE 1000. In some aspects, some of the memory/storage 1012 may be located on the processors 1004 themselves (for example, L1 and L2 cache), while other memory/storage 1012 is external to the processors 1004 but accessible thereto via a memory interface. The memory/storage 1012 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 1008 may include transceiver circuitry and radio frequency front module (RFEM) that allows the UE 1000 to communicate with other devices over a radio access network. The RF interface circuitry 1008 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna 1026 and proceed to filter and amplify (with a low-noise amplifier) the signal. The signal may be provided to a receiver of the transceiver that down-converts the RF signal into a baseband signal that is provided to the baseband processor of the processors 1004.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1026.

In various aspects, the RF interface circuitry 1008 may be configured to transmit/receive signals in a manner compatible with NR access technologies.

The antenna 1026 may include antenna elements to convert electrical signals into radio waves to travel through the air and to convert received radio waves into electrical signals. The antenna elements may be arranged into one or more antenna panels. The antenna 1026 may have antenna panels that are omnidirectional, directional, or a combination thereof to enable beamforming and multiple input, multiple output communications. The antenna 1026 may include microstrip antennas, printed antennas fabricated on the surface of one or more printed circuit boards, patch antennas, phased array antennas, etc. The antenna 1026 may have one or more panels designed for specific frequency bands including bands in frequency ranges 1 and 2.

The user interface 1016 includes various input/output (I/O) devices designed to enable user interaction with the UE 1000. The user interface 1016 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1000.

The sensors 1020 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1022 may include software and hardware elements that operate to control particular devices that are embedded in the UE 1000, attached to the UE 190, or otherwise communicatively coupled with the UE 1000. The driver circuitry 1022 may include individual drivers allowing other components to interact with or control various input/output (I/O) devices that may be present within, or connected to, the UE 1000. For example, driver circuitry 1022 may include a display driver to control and allow access to a display device, a touchscreen driver to control and allow access to a touchscreen interface, sensor drivers to obtain sensor readings of sensors 1020 and control and allow access to sensors 1020, drivers to obtain actuator positions of electro-mechanic components or control and allow access to the electro-mechanic components, a camera driver to control and allow access to an embedded image capture device, audio drivers to control and allow access to one or more audio devices.

The PMIC 1024 may manage power provided to various components of the UE 1000. In particular, with respect to the processors 1004, the PMIC 1024 may control power-source selection, voltage scaling, battery charging, or DC-to-DC conversion.

A battery 1028 may power the UE 1000, although in some examples the UE 1000 may be mounted deployed in a fixed location, and may have a power supply coupled to an electrical grid. The battery 1028 may be a lithium ion battery, a metal-air battery, such as a zinc-air battery, an aluminum-air battery, a lithium-air battery, and the like. In some implementations, such as in vehicle-based applications, the battery 1028 may be a typical lead-acid automotive battery.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more aspects, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary aspects are provided.

Example 1 includes a method of operating a source UE, the method comprising: establishing a connection with a target UE through a relay UE; detecting a trigger to perform a relay UE reselection; generating a relay UE reselection request, the relay UE reselection request to include an identifier and security capability of a candidate relay UE; and transmitting the relay UE reselection request to the target UE to perform the relay UE reselection.

Example 2 includes the method of example 1 or some other example herein, further comprising: detecting a plurality of candidate relay UEs having a corresponding plurality of security capabilities; selecting a subset of the plurality of candidate relay UEs that have security capabilities equal to or greater than a predetermined threshold; and generating the relay UE reselection request to include identifiers and security capabilities of the subset of the plurality of candidate relay UEs.

Example 3 includes the method of example 2 or some other example herein, wherein the predetermined threshold is based on a security policy of the source UE.

Example 4 includes the method of example 3 or some other example herein, further comprising: obtaining a security policy of the target UE, wherein the predetermined threshold is further based on the security policy of the target UE.

Example 5 includes the method of example 2 or some other example herein, further comprising: determining signal qualities associated with individual candidate relay UEs of the subset of the plurality of candidate relay UEs; and ordering a list of the identifiers within the relay UE reselection request based on the signal qualities associated with the individual candidate relay UEs.

Example 6 includes the method of example 1 or some other example herein, wherein detecting the trigger is based on receipt of a relay discovery message from the candidate relay UE and a signal quality associated with the candidate relay UE being greater than a signal quality associated with the relay UE.

Example 7 includes a method of operating a source UE, the method comprising: storing a security policy of the source UE and a security policy of a target UE with which the source UE is connected via a relay UE; detecting a trigger to perform a relay UE reselection; detecting a candidate relay UE having a security capability that is equal to or greater than a predetermined threshold that is based on the security policy of the source UE and the security policy of the target UE; generating a relay UE reselection request, the relay UE reselection request to include an identifier of the candidate relay UE; and transmitting the relay UE reselection request to the target UE to perform the relay UE reselection.

Example 8 includes the method of example 7 or some other example herein, further comprising: detecting a plurality of candidate relay UEs having a corresponding plurality of security capabilities; selecting a subset of the plurality of candidate relay UEs that have security capabilities equal to or greater than the predetermined threshold; and generating the relay UE reselection request to include identifiers associated with the subset of the plurality of candidate relay UEs.

Example 9 includes the method of example 8 or some other example herein, further comprising: determining signal qualities associated with individual candidate relay UEs of the subset of the plurality of candidate relay UEs; and ordering a list of the identifiers within the relay UE reselection request based on the signal qualities associated with the individual candidate relay UEs.

Example 10 includes the method of example 9 or some other example herein, further comprising ordering the list based further on security capabilities of the individual candidate relay UEs.

Example 11 includes the method of example 7 or some other example herein, wherein the security policy of the source UE includes a first threshold, the security policy of the target UE includes a second threshold, and the predetermined threshold is whichever is greater of the first and second threshold.

Example 12 includes the method of example 7 or some other example herein, further comprising detecting the trigger based on receipt of a relay discovery message from the candidate relay UE and a signal quality associated with the candidate relay UE being greater than a signal quality associated with the relay UE.

Example 13 includes the method of example 7 or some other example herein, further comprising generating the relay UE reselection request to include a security capability of the candidate relay UE.

Example 14 includes method of operating a target UE, the method comprising: communicating with a source UE through a relay UE; receiving a relay UE reselection request from the source UE, the relay UE reselection request to include an identifier and security capability of a candidate relay UE; and selecting the candidate relay UE for a relay UE reselection based on the security capability of the candidate relay UE.

Example 15 includes the method of example 14 or some other example herein, further comprising: transmitting, to the source UE, a relay UE reselection response that includes an identity of the candidate relay UE.

Example 16 includes the method of example 14 or some other example herein, further comprising: transmitting, to the source UE, an indication of a security policy of the target UE.

Example 17 includes the method of example 16, wherein transmitting the indication of the security policy comprises: transmitting the indication during a setup of a relay connection through the relay UE.

Example 18 includes the method of example 14, wherein said selecting the candidate relay further comprises: selecting the candidate relay UE based further on a signal quality associated with the candidate relay UE.

Example 19 includes the method of example 14, wherein the relay UE reselection request includes a plurality of identifiers of a corresponding plurality of candidate relay UEs and said selecting comprises: selecting the identifier from the plurality of identifiers.

Example 20 includes the method of claim 14, wherein selecting the candidate relay comprises: determining the security capability is equal to or greater than a threshold of a security policy of the target UE.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of aspects to the precise form disclosed.

Modifications and variations are possible in light of the above teachings or may be acquired from practice of various aspects.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable media having instructions that, when executed, cause processing circuitry to:
    establish a connection with a target user equipment (UE) through a relay UE;
    detect a trigger to perform a relay UE reselection;
    select, as a predetermined threshold, whichever is greater of a first threshold based on a security policy of a source UE and a second threshold based on a security policy of the target UE;
    detect a candidate relay UE having a security capability that is equal to or greater than the predetermined threshold;
    generate a relay UE reselection request, the relay UE reselection request to include an identifier and the security capability of the candidate relay UE; and
    output the relay UE reselection request for transmission to the target UE to perform the relay UE reselection.

2. The one or more non-transitory, computer-readable media of claim 1, wherein the instructions, when executed, further cause the processing circuitry to:
    detect a plurality of candidate relay UEs having a corresponding plurality of security capabilities;
    select a subset of the plurality of candidate relay UEs that have security capabilities equal to or greater than the predetermined threshold; and
    generate the relay UE reselection request to include identifiers and security capabilities of the subset of the plurality of candidate relay UEs.

3. The one or more non-transitory, computer-readable media of claim 2, wherein the instructions, when executed, further cause the processing circuitry to:
    determine signal qualities associated with individual candidate relay UEs of the subset of the plurality of candidate relay UEs; and order a list of the identifiers within the relay UE reselection request based on the signal qualities associated with the individual candidate relay UEs.

4. The one or more non-transitory, computer-readable media of claim 1, wherein the processing circuitry is to detect the trigger based on receipt of a relay discovery message from the candidate relay UE and a signal quality associated with the candidate relay UE being greater than a signal quality associated with the relay UE.

5. A baseband processor comprising:
    processing circuitry to:
        detect a trigger to perform a relay user equipment (UE) reselection;
        select, as a predetermined threshold, whichever is greater of a first threshold based on a security policy of a source UE and a second threshold based on a security policy of a target UE with which the source UE is to be connected via a relay UE;
        detect a candidate relay UE having a security capability that is equal to or greater than the predetermined threshold;
        generate a relay UE reselection request, the relay UE reselection request to include an identifier of the candidate relay UE; and
        output the relay UE reselection request for transmission to the target UE to perform the relay UE reselection; and
    interface circuitry coupled with the processing circuitry to enable communication.

6. The baseband processor of claim 5, wherein the processing circuitry is further to:
    detect a plurality of candidate relay UEs having a corresponding plurality of security capabilities;
    select a subset of the plurality of candidate relay UEs that have security capabilities equal to or greater than the predetermined threshold; and
    generate the relay UE reselection request to include identifiers associated with the subset of the plurality of candidate relay UEs.

7. The baseband processor of claim 6, wherein the processing circuitry is further to: determine signal qualities associated with individual candidate relay UEs of the subset of the plurality of candidate relay UEs; and order a list of the identifiers within the relay UE reselection request based on the signal qualities associated with the individual candidate relay UEs.

8. The baseband processor of claim 7, wherein the processing circuitry is further to order the list based on security capabilities of the individual candidate relay UEs.

9. The baseband processor of claim 5, wherein the processing circuitry is to detect the trigger based on receipt of a relay discovery message from the candidate relay UE and a signal quality associated with the candidate relay UE being greater than a signal quality associated with the relay UE.

10. The baseband processor of claim 5, wherein the processing circuitry is further to generate the relay UE reselection request to include a security capability of the candidate relay UE.

11. A method comprising:
establishing a connection with a target user equipment (UE) through a relay UE;
detecting a trigger to perform a relay UE reselection;
selecting, as a predetermined threshold, whichever is greater of a first threshold based on a security policy of a source UE and a second threshold based on a security policy of the target UE;
detecting a candidate relay UE having a security capability that is equal to or greater than the predetermined threshold;
generating a relay UE reselection request, the relay UE reselection request to include an identifier and the security capability of the candidate relay UE; and
outputting the relay UE reselection request for transmission to the target UE to perform the relay UE reselection.

12. The method of claim 11, further comprising:
detecting a plurality of candidate relay UEs having a corresponding plurality of security capabilities.

13. The method of claim 12, further comprising:
selecting a subset of the plurality of candidate relay UEs that have security capabilities equal to or greater than the predetermined threshold.

14. The method of claim 13, further comprising:
generating the relay UE reselection request to include identifiers and security capabilities of the subset of the plurality of candidate relay UEs.

15. The method of claim 14, further comprising:
determining signal qualities associated with individual candidate relay UEs of the subset of the plurality of candidate relay UEs.

16. The method of claim 15, further comprising:
ordering a list of the identifiers within the relay UE reselection request based on the signal qualities associated with the individual candidate relay UEs.

17. The method of claim 11, wherein detecting the trigger further comprises:
detecting the trigger based on receipt of a relay discovery message from the candidate relay UE and a signal quality associated with the candidate relay UE being greater than a signal quality associated with the relay UE.

* * * * *